(12) United States Patent
McCarrick et al.

(10) Patent No.: US 11,105,239 B2
(45) Date of Patent: Aug. 31, 2021

(54) EXHAUST COMPONENT WITH A HELICAL HEATER

(71) Applicant: Faurecia Emissions Control Technologies, USA, LLC, Columbus, IN (US)

(72) Inventors: Daniel McCarrick, Columbus, IN (US); Thomas Rohart, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 16/454,336

(22) Filed: Jun. 27, 2019

(65) Prior Publication Data

US 2020/0408124 A1 Dec. 31, 2020

(51) Int. Cl.
*F01N 3/20* (2006.01)
*F01N 13/00* (2010.01)
*F01N 3/26* (2006.01)

(52) U.S. Cl.
CPC ........... *F01N 3/2013* (2013.01); *F01N 3/26* (2013.01); *F01N 13/009* (2014.06); *F01N 2240/16* (2013.01); *F01N 2470/00* (2013.01)

(58) Field of Classification Search
CPC ........ F01N 3/2006; F01N 3/2013; F01N 3/26; F01N 2410/00; F01N 2410/035; F01N 2410/2066; F01N 2410/101; F01N 2470/00; F01N 2240/16; Y02T 10/12
USPC .......... 60/274, 286, 287, 288, 295, 299–301
See application file for complete search history.

(56) References Cited

U.S. PATENT DOCUMENTS

| | | | |
|---|---|---|---|
| 5,814,283 | A | 9/1998 | Matuoka et al. |
| 2012/0247084 | A1 | 10/2012 | Atluri et al. |
| 2015/0110678 | A1 | 4/2015 | Stelzer |
| 2019/0292964 | A1* | 9/2019 | Laube ..................... F01N 13/14 |
| 2020/0240305 | A1* | 7/2020 | Gaiser ................. B01D 53/944 |

FOREIGN PATENT DOCUMENTS

| | | |
|---|---|---|
| GB | 2254014 A | 9/1992 |
| JP | 2004162941 A | 6/2004 |

* cited by examiner

*Primary Examiner* — Audrey K Bradley
*Assistant Examiner* — Dapinder Singh
(74) *Attorney, Agent, or Firm* — Carlson, Gaskey & Olds, P.C.

(57) ABSTRACT

An exhaust component assembly includes a housing defining an internal passage for engine exhaust gas, at least one exhaust gas aftertreatment component within the internal passage, and at least one heater to heat the engine exhaust gas. The heater comprises a helical-shaped element with a surface that spirals about an axis for a predetermined length.

19 Claims, 1 Drawing Sheet

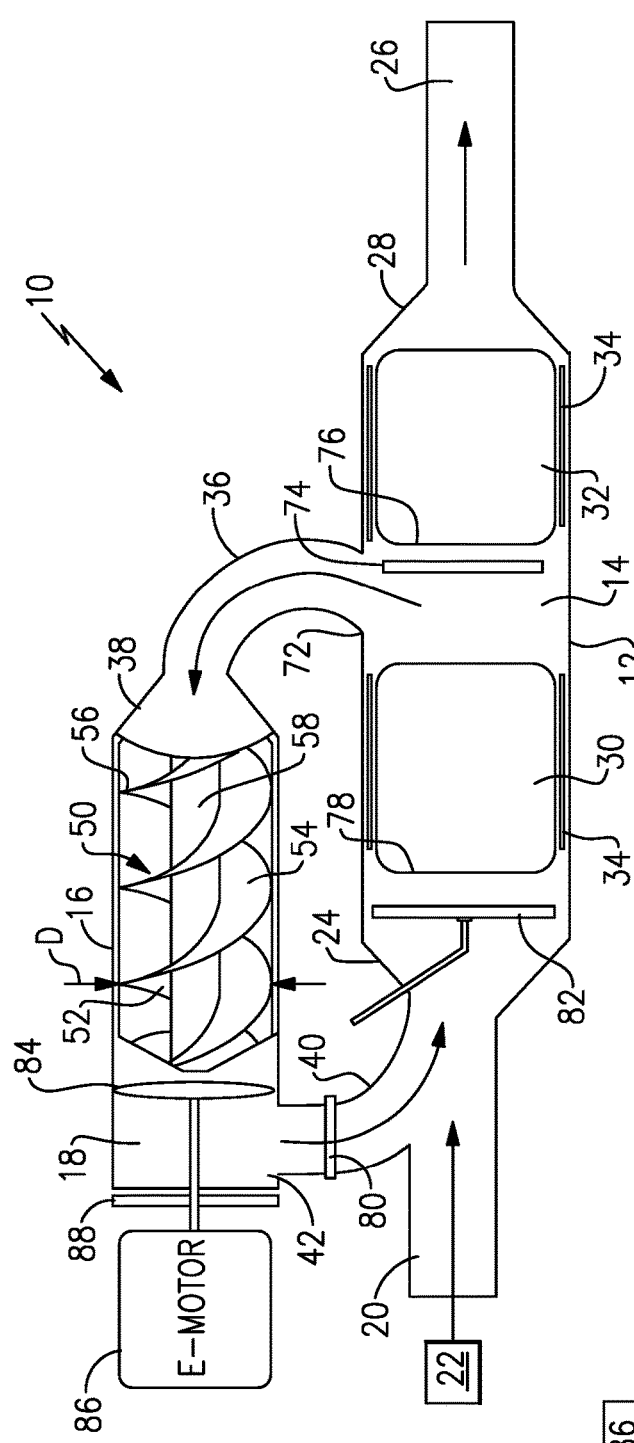
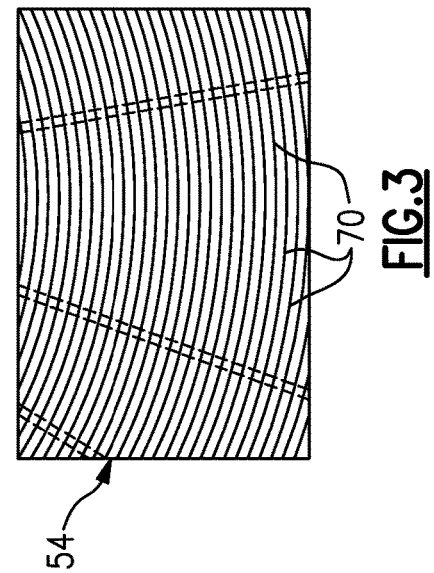
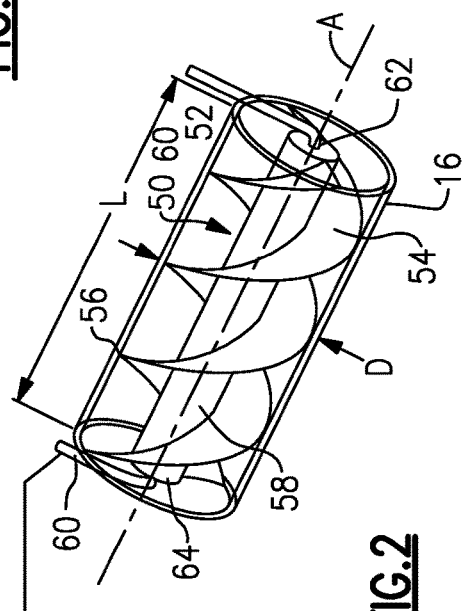
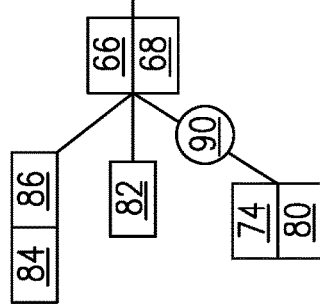

EXHAUST COMPONENT WITH A HELICAL HEATER

TECHNICAL FIELD

This disclosure relates generally to a vehicle exhaust component assembly with a helical type heater.

BACKGROUND

Vehicle exhaust systems often utilize a heater to heat exhaust gas prior to entering a catalyst. This can facilitate emissions reduction during cold start conditions. Current heater configurations are limited as to how much power can be delivered to the heater.

SUMMARY

An apparatus according to an exemplary aspect of the present disclosure includes, among other things, a housing defining an internal passage for engine exhaust gas, at least one exhaust gas aftertreatment component within the internal passage, and at least one heater to heat the engine exhaust gas. The heater comprises a helical-shaped element with a surface that spirals about an axis for a predetermined length.

In a further non-limiting embodiment of the foregoing apparatus, the surface includes a plurality of openings, and/or comprises a mesh or porous material.

In a further non-limiting embodiment of any of the foregoing apparatus, the helical-shaped element has an outermost dimension defined by an outer edge of the surface, and wherein the predetermined length is greater than the outermost dimension.

In a further non-limiting embodiment of any of the foregoing apparatus, the at least one heater further includes a center body portion extending along the axis, and wherein the surface spirals about the center body portion.

In a further non-limiting embodiment of any of the foregoing apparatus, electrodes are connected to opposing ends of the center body portion, and wherein the electrodes are connected to a power source and control module.

In a further non-limiting embodiment of any of the foregoing apparatus, the housing comprises a main housing and including a return housing in parallel with the main housing, wherein the at least one heater is positioned within the return housing, and wherein exhaust gas exiting a downstream end of the at least one exhaust gas aftertreatment component is directed into the return housing, passes through the helical-shaped element, and is directed into an upstream end of the at least one exhaust gas aftertreatment component.

In a further non-limiting embodiment of any of the foregoing apparatus, a fan is located within the return housing downstream of the helical-shaped element, and wherein the fan is driven by a motor.

In a further non-limiting embodiment of any of the foregoing apparatus, at least one valve is positioned downstream of the at least one exhaust gas aftertreatment component and is moveable at least between a first position and a second position, wherein the first position directs exhaust gas into the return housing, and wherein the second position allows exhaust gas to enter a second exhaust component that is downstream of the at least one exhaust gas aftertreatment component.

In a further non-limiting embodiment of any of the foregoing apparatus, the at least one valve comprises a first valve and including a second valve positioned upstream of the at least one exhaust gas aftertreatment component, wherein the at least one valve is moveable between an open position to allow heated exhaust gas to exit the return housing and enter an upstream end of the main housing and a closed position to prevent exhaust gas from exiting the return housing.

In a further non-limiting embodiment of any of the foregoing apparatus, the at least one exhaust gas aftertreatment component comprises a first exhaust gas aftertreatment component and the second exhaust component comprises a second exhaust gas aftertreatment component.

In a further non-limiting embodiment of any of the foregoing apparatus, the first exhaust gas aftertreatment component comprises a light off catalyst and the second exhaust gas aftertreatment component comprises a main catalyst.

In a further non-limiting embodiment of any of the foregoing apparatus, a secondary heater is positioned upstream of the at least one exhaust aftertreatment component and downstream of an outlet from the return housing.

In a further non-limiting embodiment of any of the foregoing apparatus, the secondary heater comprises a grid element.

In a further non-limiting embodiment of any of the foregoing apparatus, an inlet pipe is configured to direct exhaust gases from an engine into the upstream end of the main housing, and wherein heated exhaust gas exiting an outlet from the return housing combines with the exhaust gases from the engine to enter the upstream end of the main housing.

An apparatus, according to yet another exemplary aspect of the present disclosure includes, among other things, a first housing defining an internal passage for engine exhaust gas, at least one exhaust gas aftertreatment component positioned within the internal passage, a second housing arranged parallel to the first housing, a first connecting element connecting an outlet from the first housing to an inlet to the second housing, a second connecting element connecting an outlet from the second housing to an inlet to the first housing, and at least one heater positioned within the second housing. The at least one heater comprises a helical-shaped element with a surface that spirals about an axis for a predetermined length.

In a further non-limiting embodiment of any of the foregoing apparatus, the helical-shaped element has an outermost dimension defined by an outer edge of the surface, and wherein the predetermined length is greater than the outermost dimension.

In a further non-limiting embodiment of any of the foregoing apparatus, the surface includes a plurality of openings, and/or comprises a perforated or mesh material.

In a further non-limiting embodiment of any of the foregoing apparatus, a first valve is downstream of the at least one exhaust gas aftertreatment component and is moveable at least between a first position and a second position, wherein the first position directs exhaust gas into the second housing and blocks flow into a second exhaust component that is downstream of the at least one exhaust gas aftertreatment component, and wherein the second position allows exhaust gas to enter the second exhaust component. A second valve is upstream of the at least one exhaust gas aftertreatment component, and wherein the second valve is moveable between an open position to allow heated exhaust gas to exit the second housing and enter the inlet to the first housing and a closed position to prevent exhaust gas from exiting the second housing.

In a further non-limiting embodiment of any of the foregoing apparatus, the at least one exhaust gas aftertreatment component comprises a first exhaust gas aftertreatment component with a light off catalyst and the second exhaust component comprises a second exhaust gas aftertreatment component comprising a main catalyst.

In a further non-limiting embodiment of any of the foregoing apparatus, a fan is located within the second housing downstream of the helical-shaped element, and wherein the fan is driven by a motor.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 illustrates a vehicle exhaust system that includes a helical type heater.

FIG. 2 is a perspective view of the helical type heater as used in FIG. 1.

FIG. 3 is an enlarged view of a surface of the helical type heater shown in FIG. 2.

DETAILED DESCRIPTION

This disclosure details an exemplary vehicle exhaust system that utilizes a helical type heater to increase heating surface area such that more power can be supplied to the heater to heat a catalyst element more quickly.

FIG. 1 shows a vehicle exhaust system 10 that includes a first housing 12 defining an internal passage 14 for engine exhaust gas and a second housing 16 that is parallel to the first housing 12 and comprises a return passage 18 for the exhaust gas. The return passage 18 is selectively utilized to quickly heat the exhaust gas under cold start conditions, for example. An inlet pipe 20 receives exhaust gas generated by a vehicle engine 22 and directs the exhaust gas into an upstream end 24 of the first housing 12. An outlet pipe 26 directs exhaust gas exiting a downstream end 28 of the first housing 12 to downstream exhaust components, such as mufflers, resonators, etc. for example, and eventually to atmosphere.

In one example, a first exhaust gas aftertreatment component 30 is positioned within the first housing 12 and a second exhaust gas aftertreatment component 32 is positioned downstream of the first exhaust gas aftertreatment component 30. The first 30 and second 32 exhaust gas aftertreatment elements can comprise components such as three-way convertors (TWC), a diesel oxidation catalyst (DOC), a diesel particulate filter (DPF), a gasoline particulate filter (GPF), a selective catalytic reduction (SCR) catalyst, etc., which are used to remove contaminants from the exhaust gas as known. In one example, the first exhaust gas aftertreatment component 30 is a light off TWC and the second exhaust gas aftertreatment component is a main TWC. The TWCs include catalyst substrates that are used to remove contaminants from the exhaust gas as known. In one example configuration, an insulating mat 34 can be wrapped around the first 30 and second 32 exhaust gas aftertreatment components.

A first connecting element 36 connects the main or first housing 12 to an inlet 38 to the return or second housing 16. A second connecting element 40 connects an outlet 42 of the second housing 16 to the inlet pipe 20 and/or to the upstream end 24 of the first housing 12. At least one heater 50 is positioned in the return passage 18 of the second housing 16. In one example, the heater 50 comprises a screw or helical-shaped element 52 with a surface 54 that spirals about an axis A for a predetermined length L (FIG. 2). The helical-shaped element 52 has an outermost dimension D that is defined by an outer edge 56 of the surface 54. The predetermined length L is greater than the outermost dimension D. In one example, the predetermined length L is at least twice as great as the outermost dimension D; however, other relationships of L to D can be used depending upon the desired amount of heating surface area to be provided.

In one example shown in FIG. 2, the heater 50 includes a center body portion 58 extending along the axis A. The surface 54 spirals about the center body portion 58. Electrodes 60 are connected to opposing ends 62, 64 of the center body portion 58. The electrodes 60 are connected to a power source 66. A controller or control module 68 generates a control signal to supply power from the power source 66 to the heater 50 under predetermined vehicle operating conditions. For example, during a cold start condition where the catalysts of the TWCs need to be quickly heated such that that can effectively and efficiently operate, the control module 68 would activate the heater 50 such that the exhaust gas can be quickly brought to the desired temperature. In one example, the control signal can be initiated by a key fob or a vehicle system detection that a driver's door has been opened.

The use of the helical-shaped element 52 increases the surface area available to accept electric power as compared to a traditional planar grid heating element. The increased available heating surface accepts more power, which results in the catalyst being heated faster to achieve the desired operating temperature. Additionally, the helical design could result in a smaller cross-sectional housing being used for the heater, which would reduce the packaging space required for the heating system.

In one example shown in FIG. 3, the surface 54 of the helical-shaped element 52 can include a plurality of openings 70. This surface 54 can comprise a porous, perforated, mesh, and/or grid type surface that could further promote efficient heating.

In the example shown in FIG. 1, the main or first housing 12 includes an outlet 72 that is downstream of the first exhaust gas aftertreatment component 30 and upstream of the second exhaust gas aftertreatment component 32. This outlet 72 is fluidly connected to the first connecting element 36. A valve 74 is located within the first housing 12 between the first 30 and second 32 exhaust gas aftertreatment components. When the exhaust gas needs to be heated quickly, the control module 68 moves the valve 74 such that exhaust gas is directed away from an upstream end 76 of the second exhaust gas aftertreatment component 32 and into the first connecting element 36 to provide a closed-loop configuration. The exhaust gas then passes through the heater 50 and is directed via the second connecting element 40 back into an upstream end 78 of the first exhaust gas aftertreatment component 30. When the exhaust gas reaches the desired temperature the valve 74 will move to allow heated exhaust gas to enter the second exhaust gas aftertreatment component 32.

A second valve 80 is positioned upstream of the first exhaust gas aftertreatment component 30. The second valve 80 is moveable between an open position to allow heated exhaust gas to exit the second housing 16 and enter an upstream end of the first housing 12 and a closed position to prevent exhaust gas from exiting the second housing 16. In one example, the second valve 80 is positioned within the second connecting element 40.

In one example configuration, an optional secondary heater 82 is positioned upstream of the first exhaust aftertreatment component 30 and downstream of an outlet from the second housing 16. The secondary heater 82 comprises a planar, grid-type heater, for example, that is connected to the power source 66 and control module 68.

In one example configuration, a fan 84 is located in the second housing 16 downstream of the helical-shaped element 52. The fan 84 is driven by a motor 86 that is controlled by the control module 68 and powered with the power source 66. A heat shield 88 can be positioned at a downstream end of the second housing 16 to protect the motor 86 from the high temperatures generated by the exhaust system 10. When the control module 68 sends an activation signal, a valve actuator 90 closes the first valve 74 and opens the second valve 80 to create the closed loop system. Electrical power is then supplied to the helical-shaped element 52, the motor 86, the fan 84, and the secondary heater 82. The exhaust gas is then heated and circulated by the fan 84 back into the secondary heater 82 which is upstream of the first exhaust aftertreatment component 30. Using a combination of two heaters 50, 82 will significantly decrease the time required to achieve the desired operating temperature. Once the engine has started and can provide exhaust gas temperatures that will maintain the reduction process in the catalyst, then electric power is turned off from the heater 50, fan 84, motor 86, and secondary heater 82 if applicable. The first valve 74 is then opened and the second valve 80 is then closed via the actuator 90. Any type of known valve actuator 90 can be used such as a motor or solenoid for example. Further, each valve 74, 80 could have a separate actuator or a common actuator could be used.

The subject exhaust system 10 preheats the catalysts which significantly improves emissions performance. The use of the helical-shaped element 52 increases the amount of surface area that can be heated. Additionally, the helical construction can be made at a smaller diameter that can run the length of a relatively longer and smaller secondary tube or housing 16. The heater 50 can be used in a closed-loop or open-loop configuration.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An exhaust component assembly, comprising:
   a main housing defining an internal passage for engine exhaust gas;
   a return housing in parallel with the main housing;
   at least one exhaust gas aftertreatment component within the internal passage of the main housing; and
   at least one heater positioned within the return housing to heat the engine exhaust gas, wherein the heater comprises a helical-shaped element with a surface that spirals about an axis for a predetermined length, and wherein exhaust gas exiting the at least one heater is first directed into the at least one exhaust gas aftertreatment component prior to entering a second exhaust gas aftertreatment component
   a first connector having a first end connected to an outlet from the main housing and a second end connected to an inlet to the return housing, the outlet being downstream of the at least one exhaust gas aftertreatment component,
   a second connector having a first end connected to an outlet from the return housing and a second end connected to an inlet to the main housing, the inlet being upstream of the at least one exhaust gas aftertreatment component,
   a fan located within the return housing downstream of the at least one heater, and wherein heated exhaust gas exiting the helical-shaped element directly enters the fan and is then directed into the second connector.

2. The exhaust component assembly according to claim 1 wherein the helical-shaped element has an outermost dimension defined by an outer edge of the surface, and wherein the predetermined length is greater than the outermost dimension.

3. The exhaust component assembly according to claim 1 wherein the at least one heater further includes a center body portion extending along the axis, and wherein the surface spirals about the center body portion.

4. The exhaust component assembly according to claim 3 including electrodes connected to opposing ends of the center body portion, wherein the electrodes are connected to a power source and control module.

5. The exhaust component assembly according to claim 1 including a fan located within the return housing downstream of the helical-shaped element, and wherein the fan is driven by a motor.

6. The exhaust component assembly according to claim 1 including at least one valve positioned downstream of the at least one exhaust gas aftertreatment component and moveable at least between a first position and a second position, wherein the first position directs exhaust gas into the return housing, and wherein the second position allows exhaust gas to enter the second exhaust gas aftertreatment component that is positioned within the main housing downstream of the at least one exhaust gas aftertreatment component.

7. The exhaust component assembly according to claim 6 wherein the at least one valve comprises a first valve and including a second valve positioned upstream of the at least one exhaust gas aftertreatment component, wherein the second valve is moveable between an open position to allow heated exhaust gas to exit the return housing and enter an upstream end of the main housing and a closed position to prevent exhaust gas from exiting the return housing.

8. The exhaust component assembly according to claim 7 wherein the at least one exhaust gas aftertreatment component comprises a first catalyst and the second exhaust gas aftertreatment component comprises a second catalyst that is spaced from the first catalyst within the main housing by a gap within which the first valve is positioned.

9. The exhaust component assembly according to claim 8 wherein the first catalyst comprises a light off catalyst and the second catalyst comprises a main catalyst.

10. The exhaust component assembly according to claim 1 including an inlet pipe configured to direct exhaust gases from an engine into the upstream end of the main housing, and wherein heated exhaust gas exiting an outlet from the return housing combines with the exhaust gases from the engine to enter the upstream end of the main housing.

11. An exhaust component assembly, comprising:
a housing defining an internal passage for engine exhaust gas;
at least one exhaust gas aftertreatment component within the internal passage; and
at least one heater to heat the engine exhaust gas, wherein the heater comprises a helical-shaped element with a surface that spirals about an axis for a predetermined length, and wherein the surface includes a plurality of openings, and/or comprises a mesh or porous material.

12. An exhaust component assembly, comprising:
a housing defining an internal passage for engine exhaust gas, wherein the housing comprises a main housing and including a return housing in parallel with the main housing;
at least one exhaust gas aftertreatment component within the internal passage;
at least one heater to heat the engine exhaust gas, wherein the heater comprises a helical-shaped element with a surface that spirals about an axis for a predetermined length, wherein the at least one heater is positioned within the return housing, and wherein exhaust gas exiting a downstream end of the at least one exhaust gas aftertreatment component is directed into the return housing, passes through the helical-shaped element, and is directed into an upstream end of the at least one exhaust gas aftertreatment component; and
a secondary heater positioned upstream of the at least one exhaust aftertreatment component and downstream of an outlet from the return housing.

13. The exhaust component assembly according to claim 12 wherein the secondary heater comprises a grid element.

14. An exhaust component assembly, comprising:
a first housing defining an internal passage for engine exhaust gas;
at least one exhaust gas aftertreatment component positioned within the internal passage;
a second housing arranged parallel to the first housing;
a first connector having a first end connected to an outlet from the first housing and a second end connected to an inlet to the second housing;
a second connector having a first end connected to an outlet from the second housing and a second end connected to an inlet to the first housing; and
at least one heater positioned within the second housing, and wherein the at least one heater comprises a helical-shaped element with a surface that spirals about an axis for a predetermined length, and wherein heated exhaust gas exiting the at least one heater is first directed into the at least one exhaust gas aftertreatment component prior to entering a second exhaust gas aftertreatment component
a fan located within the second housing downstream of the helical-shaped element, and wherein heated exhaust gas exiting the helical-shaped element directly enters the fan and is then directed into the second connector.

15. The exhaust component assembly according to claim 14 wherein the helical-shaped element has an outermost dimension defined by an outer edge of the surface, and wherein the predetermined length is greater than the outermost dimension.

16. The exhaust component assembly according to claim 14 including
a first valve downstream of the at least one exhaust gas aftertreatment component and moveable at least between a first position and a second position, wherein the first position directs exhaust gas into the second housing and blocks flow into the second exhaust gas aftertreatment component that is positioned within the first housing downstream of the at least one exhaust gas aftertreatment component, and wherein the second position allows exhaust gas to enter the second exhaust gas aftertreatment component, and
a second valve upstream of the at least one exhaust gas aftertreatment component, wherein the second valve is moveable between an open position to allow heated exhaust gas to exit the second housing and enter the inlet to the first housing and a closed position to prevent exhaust gas from exiting the second housing.

17. The exhaust component assembly according to claim 16 wherein the at least one exhaust gas aftertreatment component comprises a first exhaust gas aftertreatment component with a light off catalyst and the second exhaust gas aftertreatment component comprises a main catalyst that is spaced from the light off catalyst within the first housing by a gap within which the first valve is positioned.

18. The exhaust component assembly according to claim 14 including a fan located within the second housing downstream of the helical-shaped element, and wherein the fan is driven by a motor.

19. An exhaust component assembly, comprising:
a first housing defining an internal passage for engine exhaust gas;
at least one exhaust gas aftertreatment component positioned within the internal passage;
a second housing arranged parallel to the first housing;
a first connector having a first end connected to an outlet from the first housing and a second end connected to an inlet to the second housing;
a second connector having a first end connected to an outlet from the second housing and a second end connected to an inlet to the first housing; and
at least one heater positioned within the second housing, and wherein the at least one heater comprises a helical-shaped element with a surface that spirals about an axis for a predetermined length, and wherein the surface includes a plurality of openings, and/or comprises a perforated or mesh material.

\* \* \* \* \*